United States Patent [19]
Sharman et al.

[11] Patent Number: 6,100,882
[45] Date of Patent: Aug. 8, 2000

[54] TEXTUAL RECORDING OF CONTRIBUTIONS TO AUDIO CONFERENCE USING SPEECH RECOGNITION

[75] Inventors: Richard Anthony Sharman, Southampton; Paul Stuart Adams, Winchester, both of United Kingdom

[73] Assignee: International Business Machines Corporation, Armonk, N.Y.

[21] Appl. No.: 08/369,022

[22] Filed: Jan. 5, 1995

[30] Foreign Application Priority Data

Jan. 19, 1994 [GB] United Kingdom .................. 9400965

[51] Int. Cl.[7] .......................... H04M 3/56; H04L 12/18; G06F 13/00
[52] U.S. Cl. ......................... 345/320; 704/235; 709/206
[58] Field of Search ................... 395/144–149, 395/153, 155, 161; 709/206; 345/320; 704/235

[56] References Cited

U.S. PATENT DOCUMENTS

| | | | |
|---|---|---|---|
| 4,914,586 | 4/1990 | Swinehart et al. | 707/101 |
| 4,953,159 | 8/1990 | Hayden et al. | 370/265 |
| 5,345,551 | 9/1994 | Shelley et al. | 709/106 |
| 5,526,407 | 6/1996 | Russell et al. | 345/302 |
| 5,528,739 | 6/1996 | Lucas et al. | 707/526 |

FOREIGN PATENT DOCUMENTS

| | | |
|---|---|---|
| 61-225960 | 10/1986 | Japan . |
| 2134785 | 5/1990 | Japan . |
| 2260751 | 10/1990 | Japan . |
| 5002540 | 8/1993 | Japan . |
| 5260193 | 10/1993 | Japan . |
| 5344226 | 12/1993 | Japan . |

OTHER PUBLICATIONS

European Search Report, Globecom 90 IEEE Global Tele. Conf. & Exhibition Session 308.6, vol. 1, Dec. 1990, pp. 317–321, Trends in Multimedia Applications and the Network . . . IBM TDB vol. 36, No. 3, Mar. 1993, p. 311, "Word translation profiles".

Williford et al., "GRAND Computer Conferencing—What have we learned", Proceedings of the Twenty–First Annual Hawaii Int'l Conf. on System Sciences, v. II. pp. 732–742, Jan. 1988.

Vin et al., "Multimedia conferencing in the Etherphone environment", Computer, v. 24, No. 10, pp. 69–79, Oct. 1991.

Schmandt et al., "An audio and telephone server for multi-media workstations", Proceedings of the2nd IEEE Conf. on Computer Workstations, pp. 150–159, Mar. 1988.

Ahuja et al., "Coordination and control of multimedia conferencing", IEEE Communications Magazine, vol. 30, No. 5, pp. 38–43, May 1992.

Morse, "Using Computer Conferencing to Improve Productivity in the 90's", Proceedings of 1988 IEEE Engineering Management Conf., pp. 177–186, Oct. 1988.

*Primary Examiner*—Mark R. Powell
*Assistant Examiner*—Jeffrey Allen Rossi
*Attorney, Agent, or Firm*—Jeanine S. Ray-Yarletts

[57] ABSTRACT

A computer workstation supports speech recognition software 50 and conferencing software 45, and is involved in an audio conference with one or more other workstations. Speech from the user at that workstation is transmitted to the other workstation(s), and also converted into text by the speech recognition software. The conferencing software then transmits the text to the other workstation(s). Likewise, the conferencing software also receives the text equivalent of spoken contributions from the other workstation(s). This received text, together with the locally generated text, is stored in a text file so as to produce a set of minutes for the audio conference.

16 Claims, 5 Drawing Sheets

TEXTUAL RECORDING OF CONTRIBUTIONS TO AUDIO CONFERENCE USING SPEECH RECOGNITION

The present invention relates to an audio conferencing system, and in particular to a method of textually recording at a workstation spoken contributions to an audio conference, each participant in the conference having an associated workstation, the workstations being linked together by one or more networks.

BACKGROUND OF THE INVENTION

In recent years there has been a significant improvement in the performance of automatic speech recognition systems. Commercially available systems such as the Personal Dictation System (IPDS) from IBM are capable of recognising natural language, providing the words are spoken discretely (ie the words are not run together but rather there is a distinct gap between adjacent words). Future development will of course further enhance the capabilities of such systems over the coming years, for example to allow full recognition of continuous speech. Automatic speech recognition systems such as the above-mentioned IPDS from IBM are now being offered for use as dictation machines, whereby a person dictating a letter or other document speaks to the system, which then automatically converts the speech into text. See "Computers that Listen", p30–35, New Scientist Dec. 4, 1993 for additional background information on such systems.

Whilst such a facility is clearly very powerful, there are some limitations on current technology that are not likely to be overcome in the foreseeable future. An example of such a restriction is for example where there are several speakers in a meeting, and to correctly minute the meeting there is a need to determine who is speaking at any particular time. In such circumstances a human recorder would typically rely on both visual and aural information in order to attribute speech to the correct speaker. Clearly an automatic speech recognition is unable to take advantage of such extra information, and so is unable to to replace a human recorder for this type of work.

Another area of technology which has seen considerable development over the past few years is teleconferencing. The driving force behind this activity is the recognition that face to face meetings, especially those which involve international journeys, are not only expensive, but also the excessive travelling necessarily wastes considerable time. It is therefore common nowadays for organisations to provide video teleconferencing suites, typically allowing parties in two or more remote sites to effectively hold a meeting together, despite their disparate locations.

The video suites required for conventional teleconferencing require expensive equipment and investment. Very recently therefore there has been a move to develop desk-top conferencing systems. Such systems exploit the fact that it is common for business people to have their own personal computer or workstation on their desk, and that these workstations are increasingly being linked together by various types of network, eg local area networks (LANs), or integrated services digital network (ISDN). The addition of suitable audio and video hardware to these workstations allows a distributed and highly flexible teleconferencing system to be provided. Examples of such multimedia conferencing systems are described in "Distributed Multiparty Desktop Conferencing System: MERMAID" by K Watabe, S Sakata, K Maeno, H Fukuoka, and T Ohmori, p27–38 in CSCW '90 (Proceedings of the Conference on Computer-Supported Cooperative Work, 1990, Los Angeles); "Personal Multimedia Multipoint Communications Services for Broadband Networks" by E Addeo, A Gelman and A Dayao, p53–57 in Vol 1, IEEE GLOBECOM, 1988; and "Personal Multimedia-Multipoint Teleconference System" by H Tanigawa, T Arikawa, S Masaki, and K Shimamura, p1127–1134 in IEEE INFOCOM 91, Proceedings Vol 3. A distributed audio conferencing system is described in U.S. Pat. No. 5,127,001.

JP-2-260750-A describes a conferencing system in which each terminal is fitted with a controller. The terminal with the loudest output is fed to a speech-to-text conversion unit, which is subsequently used to make a record of the conference. JP-2-260751 describes a conferencing system in which a speech buffer is provided for each terminal. The stored speech is then directed to a central speech-to-text unit when there is no voice activity at the associated terminal. Although these two applications teach a basic facility for minuting meetings, they suffer from a lack of flexibility and non-optimum usage of speech recognition systems.

Accordingly, the invention provides a method of textually recording at a workstation spoken contributions to an audio conference, each participant in the conference having an associated workstation, the workstations being linked together by one or more networks, the method comprising the steps of:

receiving local speech input at the workstation;

performing speech recognition on the local speech input at the workstation to generate a local text equivalent;

transmitting the local speech input to the other participant(s) in the conference;

receiving spoken contributions from the other participant(s) in the conference plus the corresponding text equivalents transmitted from the workstation associated with the respective participant;

storing both the local text equivalents and the text equivalents received from the other workstation(s) in a text file.

The audio conference itself can be implemented either over the network linking the workstations together, or over a separate network, for example using a conventional telephone conference. In the latter case the local speech input must be detected both by the conferencing system (eg telephone) and the microphone associated with the workstation for input into the speech recognition system. There is no requirement for any video conferencing facility, although this could be added to the system if desired.

The invention provides a distributed system for recording the minutes at a meeting, relying on real-time speech recognition at each participating node. Speech recognition has such a wide range of use that it will effectively become a standard feature of personal computers. By performing local speech recognition, the quality of the audio input signal is maximised (eg it is not distorted by transmission over the telephone network). Furthermore, each speech recognition systems can be trained to the user of that particular workstation; such speaker-dependent recognition offers improved accuracy over speaker-independent recognition. Another important aspect is that by using speech recognition in the desk top conferencing environment, the problem of attributing speech to different parties is readily solved; at any given workstation only the speech from the user of that workstation is converted into text, and this can then be readily marked with an indicator of origin (such as the name of the speaker or workstation). Thus when the text equivalents are combined into a single record in the text file, they already contain information identifying their source.

The only drawback of the local speech recognition is that the transmission of text format in addition to the audio could be regarded as redundant, although the extra bandwidth required by the text format is negligible. Conceivably one could drop the audio transmission, relying completely on the text format, which would be reconstituted into audio format at each receiving workstation using speech synthesis; however this is not very practicable, since the processing delay and recognition inaccuracies prevent any natural conversation, at least with current technology (moreover, future development of communications links is likely to provide ample bandwidth for audio transmissions). Nevertheless, such an approach may possibly be of interest for multilingual conferences, when an automatic translation unit could be interposed between the speech recognition and speech synthesis to convert the text into the correct language for each participant, although it will be appreciated that such a system is still some way off in the future.

Generally each text equivalent of a spoken contribution stored in said text file is accompanied by the time of the contribution and/or an indication of the origin of that spoken contribution, thereby providing an accurate record of the conference. Normally the indication of origin of a spoken contribution will be the name of the participant, but may also be the identity of the workstation from which the message was transmitted, if the former information is not available. The time recorded may be the time at which the message containing that contribution was received or alternatively, the time at which the text equivalent was actually generated at the originating workstation. The latter approach is more accurate, but requires the time to be included in the message itself. In general it will be necessary to edit the minutes text file after completion, for example to correct inaccuracies in the speech recognition. This can be performed jointly by all the participants in the conference using a shared editor to produce a single agreed set of minutes.

In a preferred embodiment the method further comprises the step of visually displaying at the workstation both the local text equivalents and the text equivalents received from the other workstation(s). This is useful if a participant in the conference has impaired hearing, or is having to understand a foreign language, in which case the displayed text may be easier to comprehend than the speech itself. Moreover, it provides a real-time indication to the participants of the text that is being recorded in the minutes.

In a preferred embodiment the text equivalents are visually displayed in a set of parallel columns, whereby each column displays the text equivalents of the spoken contributions from a single workstation. Preferably the method further includes the step of adjusting the cursor position within each of the columns after each new spoken contribution has been displayed to maintain horizontal alignment between the columns with regard to time synchronisation. Thus when read down the display the different contributions are correctly sequenced according to the order in which they were made.

Preferably the method further comprises the step of transmitting the local text equivalent of said local speech input to the other workstation(s) in the conference. This is useful for example to allow the other workstation(s) to display the text of spoken contributions made at the local workstation. The other workstation(s) could of course form their own set of minutes, although this might prove confusing and it may be best from a practical point of view to agree on just one node recording the minutes. To facilitate this the text recording process can be turned on and off during the audio conference (ie typically only a single node will turn on the text recording process). Note also that the ability to only record selected portions of the conference is useful to prevent the minutes becoming excessively long. Typically text recording might be turned on after a point has been discussed to allow the conclusions and any necessary actions arising therefrom to be minuted.

The invention further provides a system for textually recording at a workstation spoken contributions to an audio conference, each participant in the conference having an associated workstation, the workstations being linked together by one or more networks, the method comprising the steps of:

means for receiving local speech input at the workstation;

means for performing speech recognition on the local speech input at the workstation to generate a local text equivalent;

means for transmitting the local speech input to the other participant(s) in the conference;

means for receiving spoken contributions from the other participant(s) in the conference plus the corresponding text equivalents transmitted from the workstation associated with the respective participant;

means for storing both the local text equivalents and the text equivalents received from the other workstation(s) in a text file.

BRIEF DESCRIPTION OF THE DRAWINGS

An embodiment of the invention will now be described by way of example with reference to the following drawings.

DETAILED DESCRIPTION OF THE PREFERRED EMBODIMEENT

Figure 1:
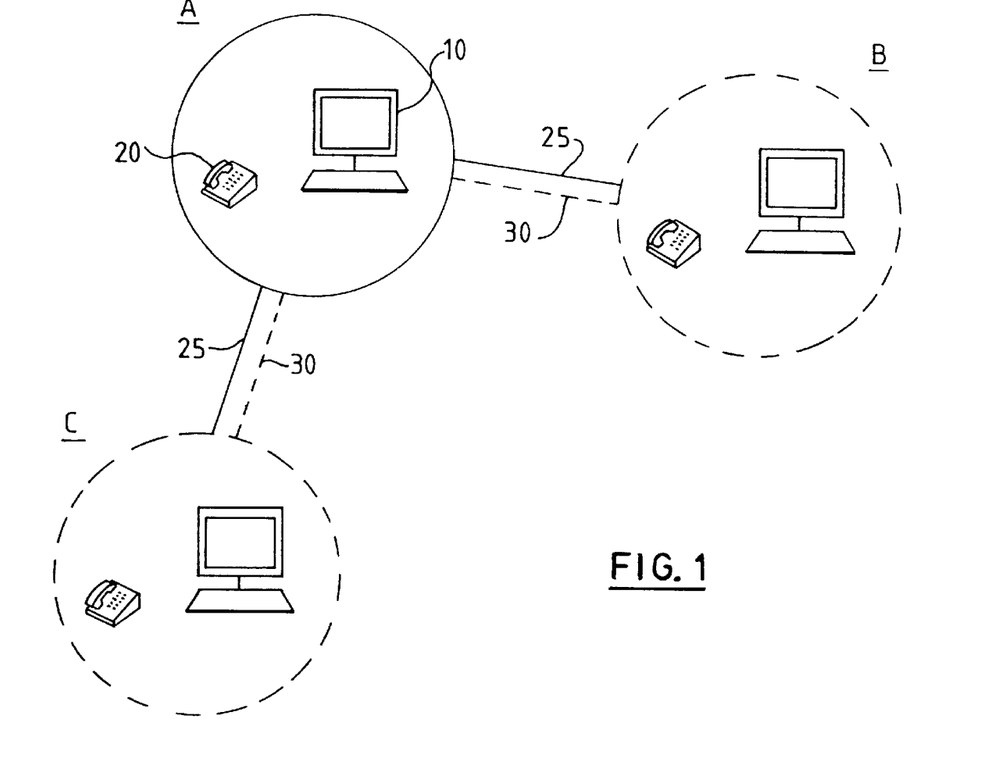
FIG. 1 is a schematic representation of an audio conference.

FIG. 1 is a schematic representation of an audio conference between parties A, B, and C. Each party is equipped with a computer workstation 10 and a telephone 20. As explained in more detail below, the computer workstations are running the Person to Person (P2P) desktop conferencing program available from IBM. This provides for the exchange of messages (and optionally video) between the three parties. The messages are transmitted over links 25, which may form part of a local area network (LAN) or an integrated services digital network (ISDN), be asynchronous lines, or any other form of link supported by P2P. Note that there is no requirement under P2P for the conference to be over a homogeneous network; thus the link from A to B might be a LAN connection, whilst the link from A to C might be an ISDN connection. It will be appreciated that although FIG. 1 shows only three parties, the invention is not so limited: P2P provides support for a conference of up to six parties, and even larger conferences may be available using other analogous software products.

The three parties A, B and C are participating in a three-way conference, whereby each workstation receives the audio signals of all the other workstations in the conference. The P2P software does not provide for voice communications (although this may change with future versions). Therefore, the audio part of the conference is implemented using standard telephones linked together using conventional telephone conferencing technology. The telephone connections are shown separately using dotted lines 30 in FIG. 1. However, it would also be possible to transmit the audio signal over the same links 25 that connect the workstations together: for example, the transmission of audio over a LAN is described in "Using Local Area Networks for Carrying Online Voice" by D Cohen, pages 13–21 and "Voice Transmission over an Ethernet Backbone" by P Ravasio, R Marcogliese, and R Novarese, pages 39–65, both in "Local Computer Networks" (edited by P Ravasio, G Hopkins, and N Naffah; North Holland, 1982). Likewise, audio+data transmission over ISDN is the subject of relevant CCITT standards, whilst if the computer workstations are linked by asynchronous lines, modern modems such as WaveRunner from IBM are capable of multiplexing data and voice over the same link. Some commercially available conferencing software systems provide automatically for voice and data communications. Note also that the audio conferencing may be implemented either as a centralised system in which audio signals from each node go to a central multipoint control unit, where they are summed together before distribution to the participants in the conference, or as a distributed system in which each node broadcasts its audio signal direct to every other node in the conference. The particular architecture and format of the audio conference are not material to the present invention.

Figure 2:
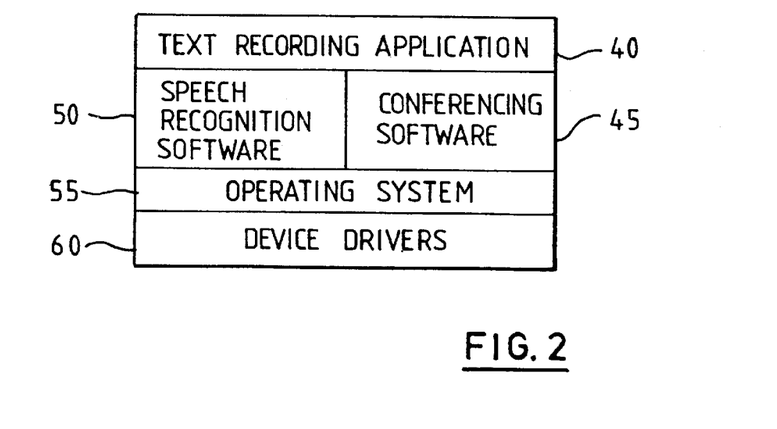
FIG. 2 is a simplified block diagram of the major software components running on a node in the network of FIG. 1.

FIG. 2 is a simplified block diagram of the main software components running on a workstation 10 participating in the conference of FIG. 1. The operating system 45 is responsible for the basic functions of the computer in accordance with known techniques, and is also responsible for providing a graphical user interface whereby the user can perceive and enter information on a display screen. A suitable operating system is the multi-tasking OS/2 operating system available from IBM. Above the operating system are three applications. The first of these is the speech recognition software 50, in this case the IBM Personal Dictation System (IPDS). The purpose of this software is to receive audio input and convert it into text in accordance with known speech recognition principles. The second application is the conferencing software 45, in this case the Person to Person software product, also available from IBM. Note that the only essential requirement of the conferencing system is that it is capable of sending text messages from one machine to another effectively in real-time. This facility is easily achieved using known computer communication techniques. The conferencing software may also provide audio and video communications, although the former can be provided using conventional telephones, as shown in FIG. 1, whilst the latter is purely optional. The final application, the text recording application 40, effectively controls the speech recognition software and the conferencing software, and is described in more detail below. Also included in FIG. 2 are device drivers 60, which allow the operating system as well as the speech recognition software and the conferencing software to interact with particular hardware components of the computer workstation in accordance with known techniques.

Figure 3:
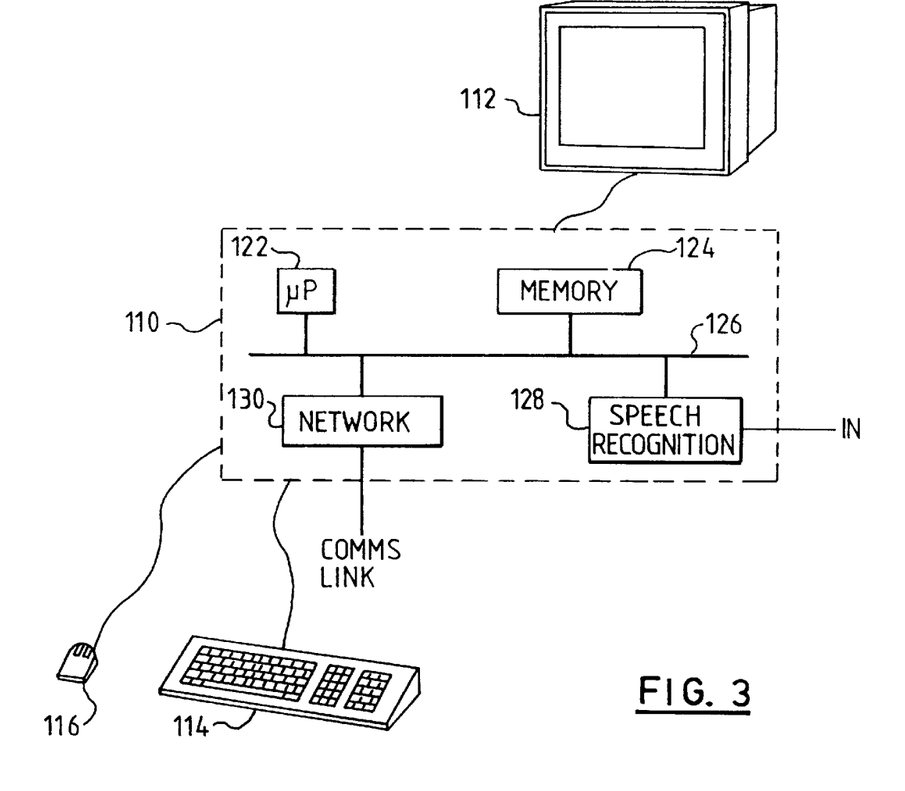
FIG. 3 is a simplified block diagram of a computer workstation for use in the conference of FIG. 1.

FIG. 3 is a simplified schematic diagram of a computer system which may be used in the network of FIG. 1. The computer has a system unit 110, a display screen 112, a keyboard 114 and a mouse 116. The system unit 110 includes microprocessor 122, semi-conductor memory (ROM/RAM) 124, and a bus over which data is transferred 126. The computer of FIG. 3 is typically a workstation such as an IBM PS/2 Model 95 computer (note that the IPDS speech recognition software 50 requires a reasonably powerful workstation, typically having at least equivalent performance to the above-mentioned IBM PS/2 Model 95 computer). The computer of FIG. 3 is equipped with two adapter cards. The first of these is a network adapter card 130, which together with accompanying software allows messages to be transmitted to and received from the other workstations shown in FIG. 1. The network adapter card may be Token Ring (LAN) or ISDN, both available from IBM, or any other suitable communications device. The workstation may also have more than one adapter card to support a plurality of different communication formats. The operation of such network adapter cards is well-known and so will not be described in more detail. The second card is a speech recognition card 128 which is connected to a microphone for audio input. This card performs the digital sampling and encoding of the incoming audio, plus some of the processing associated with speech recognition. Assuming that the speech recognition software shown in FIG. 2 is the above-mentioned IPDS, then the speech recognition card will be a Martin_LC card (also available from IBM).

Figure 4:
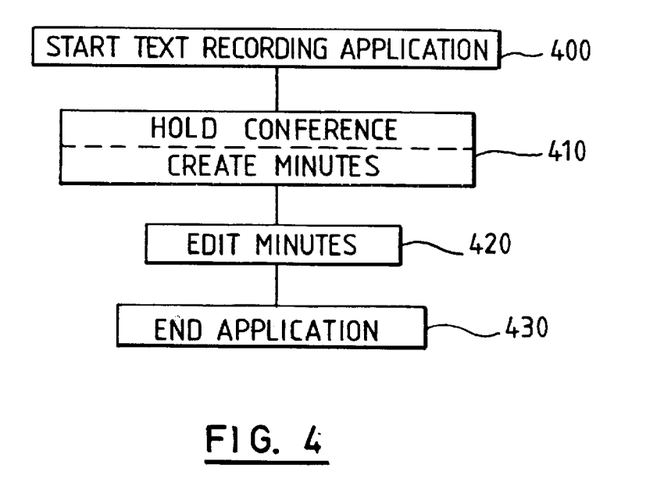
FIGS. 4–8 are flow charts illustrating various aspects of the text recording application of FIG. 2.

The text recording application 40 will now be described in more detail with reference to FIGS. 4 to 8. This application is event-driven; ie it responds to events or messages from other programs in accordance with known computer programming techniques. FIG. 4 is a high-level diagram of the behaviour of the text recording application. Essentially the application first performs an initialisation (step 400), before holding the conference (step 410). During the conference minutes can be created; the minute recording function can be turned off and on during the conference. After the conference has concluded there is a chance to edit the minutes (step 420), prior to termination of the conference application (step 430).

Figure 5:
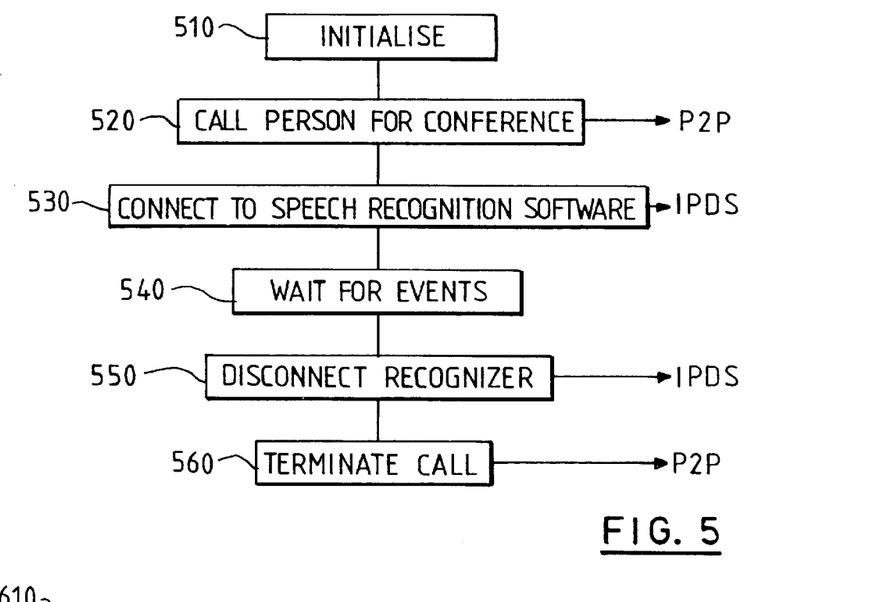

FIG. 5 shows the initialisation and termination procedures of the hold conference portion 410 of the text recording application. The conference starts with a general initialisation (step 510), followed by calls to start the P2P conferencing software 45 (step 520) and the IPDS speech recognition software 50 (step 530). Once this has been achieved, the system is now ready to receive events for processing (step 540), as described in more detail below. To terminate the conference the opposite actions are taken: ie the text recording software disconnects from the speech recognition software (step 550) and terminates the conference call (step 560).

Figure 6A:
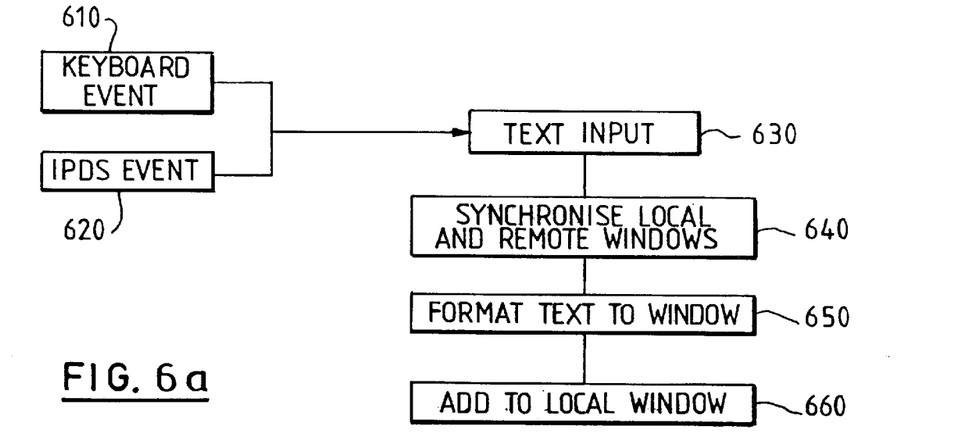
Figure 6B:
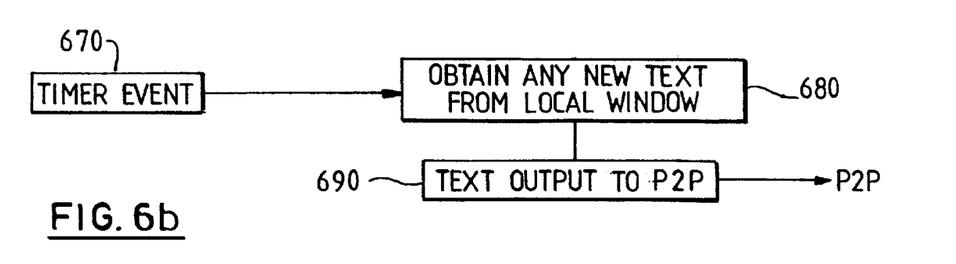

The processing of locally generated events by the text recording application is shown in FIG. 6A. Essentially events may be received either in response to user input from the keyboard of the workstation (610), or from the speech recognition software (620). The former occurs when the user wants to type something for display to the other participants in the conference (ie equivalent to a standard "talk" function). The latter arises from the user speaking as part of the audio conference. His or her speech is picked up by the microphone and passed to the speech recognition software for conversion into text. Each time the speech recognition software decodes another word, it raises an event 620, allowing the decoded word to be passed to the text recording application.

The text recording application therefore obtains text input 630, whether the result of speech recognition or typed user input. This text input is then formatted (step 650) and displayed in a window (step 660) corresponding to the local node (the display presented to the user is described in more detail below, but essentially there is one window for each participant in the conference, including the participant at the local node). Prior to this display, the cursor position in the local window is synchronised with that of the remote windows (step 640), in other words, the cursor is moved to just beneath the bottom of any text in any of the other windows. This is achieved by maintaining a global variable indicating the position of the most recently written text in any window, which is updated each time new text is written to a window. Thus the cursor position can be synchronised with the other windows in accordance with the value stored in this global variable.

The text recording application also includes a timer, which regularly generates an event after a predetermined time interval. Whenever the text recording application receives an event from the timer 670 (see FIG. 6B), it takes any text added to the local window since the last such event (step 680), and submits it to the conferencing software (step 690), which then forwards it to the other participants in the conference using known messaging techniques. In the current embodiment the predetermined time interval is 5 seconds. Note that if this value is shorter, more messages are sent over the network, adding to the bandwidth required; alternatively, if this value is increased, the delay between audio or text entry at the local node and display at a remote node gets longer which can result in usability problems. The selection of 5 seconds for the predetermined interval is therefore a compromise between these two factors, but can be tuned to individual circumstances. In particular, if bandwidth and other transmission overheads are not a problem, a shorter value could be used.

Figure 7:
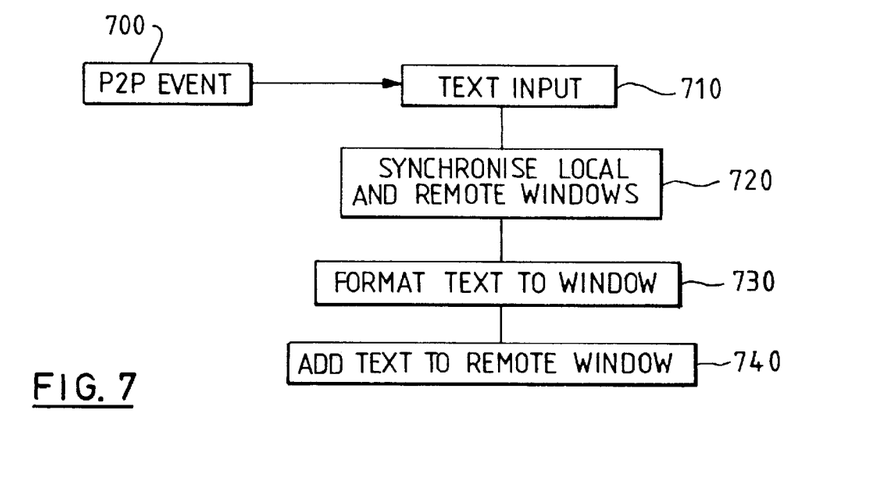
Figure 8:
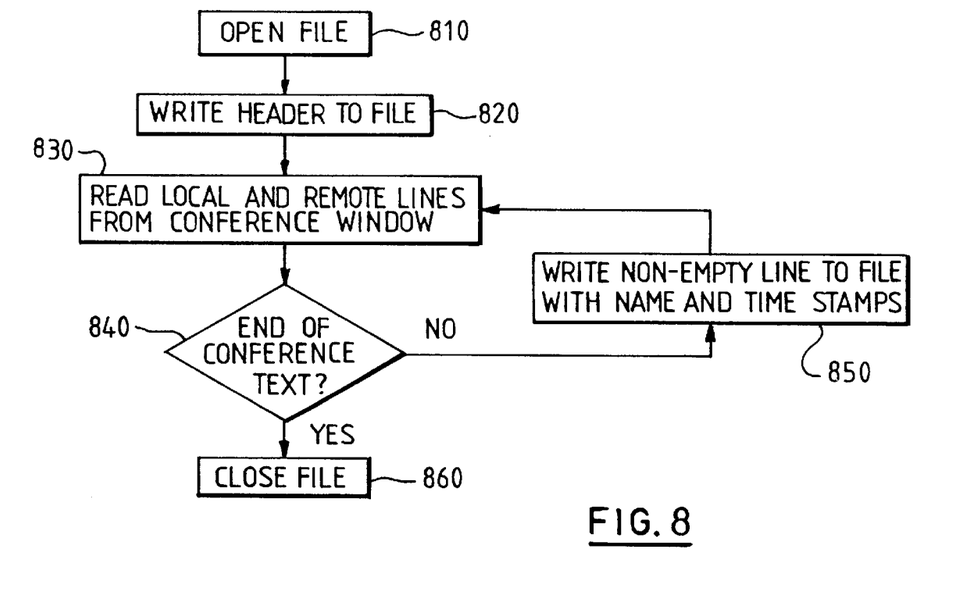

FIG. 7 shows the receipt of a message from a remote node in the form of an event 700 received from the conferencing software. The actual transmission of messages between the local and remote nodes (and vice versa) is well-known in the art and will not be described in more detail. The conferencing software then passes the received message plus an identification of the originating node to the text recording application (step 710). The text recording application then synchronises the local and remote windows again (step 720): as described above, this essentially means that the cursor position is moved to immediately below the most recent addition to any window. The received text can then be formatted (step 730) and added to the window corresponding to the originating node (step 740).

The actions shown in FIG. 7 lead to a textual display of the spoken contributions to the conference, but no permanent record. The latter is achieved by the process of FIG. 8, which is invoked by turning on the create minutes facility (see step 410 in FIG. 4). This then opens a file (step 810) in which to record the minutes, and writing suitable header information such as the time and date at the top of the file (step 820). The text written onto the screen is then read from the two windows using standard programming techniques (step 830), and copied to the minutes file together with the date, time, and identification of the node from which or participant from whom they originated (step 850). The point at which text recording starts is under user control (note that even text that has scrolled out of the window and is no longer visible on the actual display remains available). The process essentially scans all windows in parallel, ie one line at a time across all windows. Because the different contributions are synchronised on writing to the windows, and assuming only one person is speaking at any given time, the output from this scanning process will contain each of the different contributions, already correctly ordered. This process continues until the create minutes facility is turned off, the available text has all been recorded (step 840) or the conference concludes, leading to the closure of the minutes file (step 860).

It is then possible to edit the minutes file using a conventional text editor. This can be done whilst the conference is still in progress, eg the minutes are read out so that everyone can hear and agree to them. It is also possible to use a shared editor, in which the set of minutes is simultaneously displayed on all workstations and can be jointly edited. It is straightforward to implement such a shared editor using the P2P conferencing software.

Note that the time associated with each entry into the minutes is the arrival time of the message containing the entry at the local node (ie the node recording the minutes). Clearly due to transmission delays this will be slightly later than the actual time at which the relevant words were spoken. If necessary this could be overcome by including in each text message sent between nodes the time at which the message was originally generated. This time could then be entered into the minutes in association with the corresponding text, rather than a locally generated time, and the minutes text file then correctly sequenced in a subsequent processing stage. Note also that because text is accumulated in a 5 second buffer prior to transmission over the network, this delay may conceivably lead to some uncertainty about the relative timings of very brief remarks (eg person A may speak followed by person B, but the 5 second timer in B's machine expires first, leading eventually to the comment from B being entered into the minutes before that of A). If such problems do arise they can be easily rectified by reducing the period of the timer from 5 seconds to a smaller value.

Figure 9:
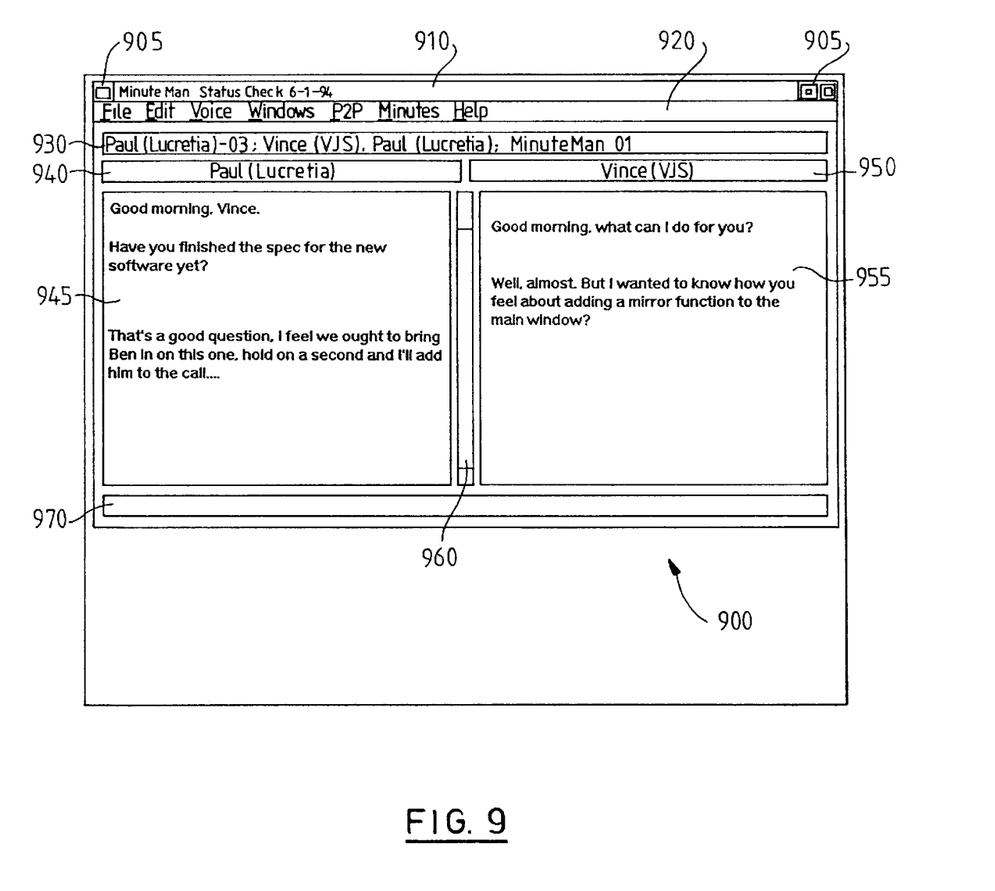
FIG. 9 illustrates the display presented to the user by the text recording application of FIG. 2.

FIG. 9 illustrates a typical screen displayed at the workstation for a two-way conference, and in particular the window 900 for the text recording application. This window includes buttons 905 in the top left and right corners for performing sizing and other operations on the window, in accordance with standard programming techniques. The top bar 910 of the window shows the name of the text recording application ("Minute Man"), plus the name that has been given to this particular conference ("Status check"). Beneath this is a menu bar 920 which if selected present the user with a set of possible actions (as is standard for computer programs). The different options available are:

File: this is used to set or change the name of the conference (currently "Status Check), control printing options, etc Edit: this provides standard editing operations such as cut-andpaste which allow the text displayed to be manipulated Voice: this is used to initiate the speech recognition software, identify the speaker to it, and so on Windows: this option is standard with P2P applications, and allows the user to see which other applications are active P2P: this option is used to control the conference, for example to add or remove parties from the conference Minutes: this option is used to start-generating an actual text file of minutes from the text displayed on the screen, and can also be used for example to invoke a shared editor to edit the minutes Help: standard help function Note that the lowest bar 970 in the window is used to provide one line of text information about an option whenever a particular option is selected from the menu bar 920 (ie it is a rudimentary form of help).

The next bar 930 in the window provides simple status information about the conference. First listed is the name of the local conference participant and node ("Paul" and "Lucretia" respectively). The "03" identifies which P2P conference this is (it is possible to run more than one conference simultaneously). Next the two participants are listed plus their machines, and finally it is indicated that this is the first instance of Minute Man running (again it is possible to run more than one in parallel).

Next two bars 940, 950 identify the participants and their machines (obviously the number of bars displayed here would correspond to the number of participants in the conference). Beneath each of the participant bars is a window 945, 955 containing the recognised speech of that participant. It will be noted how the contributions of each participant are spaced as described above, to provide proper sequencing of the different contributions. Between the two windows is a scroll bar 960, which can be used to scroll the contents of the two windows forwards or backwards, thereby permitting earlier text to be reviewed.

The facility to turn the minute recording function on and off is useful to avoid excessive amounts of text being recorded. Typically it is most efficient to discuss a point, and then minute a summary of the conclusion of the discussion plus any associated actions. This can be carefully entered using discrete speech to ensure optimum speech recognition. This also minimises the need for reviewing large quantities of text generated by the speech recognition unit, which may well be rather inaccurate since the participants are unlikely to maintain careful speech all through the conference (note that if they in fact slip into continuous speech, the IPDS will simply ignore this as noise). Normally a single set of minutes will be created at one workstation in a conference, which can be edited and agreed upon by all the participants. This set of minutes is then distributed to the other workstations, which therefore do not need to generate their own separate set.

Although in the above-described embodiment the speech recognition software resides on the same physical workstation as the conferencing software, it is also contemplated that a client-server architecture may be used, whereby the speech recognition software is located on a separate server machine. Typically the server machine would have high processing speeds, and be connected to the client workstations by a high bandwidth LAN. It would then be fed the audio input, and return the text of the recognised speech to the workstation, effectively in real-time.

What is claimed is:

1. A method of textually recording at a workstation spoken contributions to an audio conference, each participant in the conference having an associated workstation, the workstations being linked together by one or more networks, the method comprising the steps of:

receiving local speech input at the workstation;

performing speech recognition on the local speech input at the workstation to generate a local text equivalent;

transmitting the local speech input to the other participant(s) in the conference;

receiving spoken contributions from the other participant(s) in the conference plus the corresponding text equivalents transmitted from the workstation associated with the respective participant;

storing both the local text equivalents and the text equivalents received from the other workstation(s) in a text file.

2. The method of claim 1, wherein each text equivalent of a spoken contribution stored in said text file is accompanied by the time of the contribution and/or an indication of the origin of that spoken contribution.

3. The method of claim 1 further comprising the step of transmitting the local text equivalent of said local speech input to the other workstation(s) in the conference.

4. The method of claim 3 wherein said step of transmitting the local text equivalent to the other workstations occurs regularly after a predetermined time interval.

5. The method of any preceding claim, further comprising the step of visually displaying at the workstation both the local text equivalents and the text equivalents received from the other workstation(s).

6. The method of claim 5, wherein each text equivalent of a spoken contribution is displayed accompanied by the time of the contribution and/or an indication of the origin of that spoken contribution.

7. The method of claim 6, wherein the text equivalents are visually displayed in a set of parallel columns, whereby each column displays the text equivalents of the spoken contributions from a single workstation.

8. The method of claim 7, further including the step of adjusting the cursor position within each of the columns after each new spoken contribution has been displayed to maintain horizontal alignment between the columns with regard to time synchronisation.

9. The method of claims 6, 7 or 8 further comprising the step of editing said text file.

10. The method of any of claims 1,2,3 or 4 wherein the text recording can be turned on and off during the audio conference.

11. A system for textually recording at a workstation spoken contributions to an audio conference, each participant in the conference having an associated workstation, the workstations being linked together by one or more networks, the method comprising the steps of:

means for receiving local speech input at the workstation;

means for performing speech recognition on the local speech input at the workstation to generate a local text equivalent;

means for transmitting the local speech input to the other participant(s) in the conference;

means for receiving spoken contributions from the other participant(s) in the conference plus the corresponding text equivalents transmitted from the workstation associated with the respective participant;

means for storing both the local text equivalents and the text equivalents received from the other workstation(s) in a text file.

12. The system of claim 11, further comprising means for transmitting the local text equivalent of said local speech input to the other workstation(s) in the conference.

13. The system of claim 11 or claim 12, further comprising means for visually displaying at the workstation both the local text equivalents and the text equivalents received from the other workstation(s).

14. The method of claim 2, further comprising the step of transmitting the local text equivalent of said local speech input to the other workstation(s) in the conference.

15. The method of claim 14 further comprising the step of visually displaying at the workstation both the local text equivalents and the text equivalents received from the other workstation(s).

16. The method of claim 15 wherein the text recording process can be turned on and off during the audio conference.

* * * * *